United States Patent [19]

Luscombe

[11] Patent Number: 4,986,121
[45] Date of Patent: Jan. 22, 1991

[54] APPARATUS FOR MEASURING THE VERTICAL MOTION OF A FLOATING PLATFORM

[75] Inventor: John Luscombe, Oxford, England

[73] Assignee: Technical Survey Services Ltd., Bicester, England

[21] Appl. No.: 406,312

[22] Filed: Sep. 12, 1989

[51] Int. Cl.$^5$ .................. G01C 21/16; G01P 15/00
[52] U.S. Cl. ........................... 73/170 A; 73/178 R
[58] Field of Search ..................... 73/170 A, 178 R

[56] References Cited

U.S. PATENT DOCUMENTS

| | | | |
|---|---|---|---|
| 3,840,726 | 10/1974 | Harrison | 73/178 R |
| 4,038,527 | 7/1977 | Brodie | 244/3.2 |
| 4,515,013 | 5/1985 | Hue | 73/170 A |

FOREIGN PATENT DOCUMENTS

| | | |
|---|---|---|
| 0106777 | 4/1984 | European Pat. Off. . |
| 0411124 | 5/1934 | United Kingdom . |
| 0518546 | 3/1940 | United Kingdom . |
| 1307310 | 2/1973 | United Kingdom . |
| 1548794 | 9/1979 | United Kingdom . |

Primary Examiner—Donald O. Woodiel
Attorney, Agent, or Firm—Marjama & Pincelli

[57] ABSTRACT

An apparatus and method for measuring the vertical motion of a floating platform e.g. a survey vessel, caused by wave action. The apparatus includes a sensor having three accelerometers (11,12,13) arranged on mutually perpendicular axes (Ax,Ay,Az) so that one accelerometer acts in a vertical plane and the other two act in a horizontal plane. Output signals (S1,S2,S3) from the accelerometers are continually sampled through a multiplexer (14) and are passed through an ADC (19) and a shift register (21) to provide output signals for a data processor (D) which provides a signal A indicative of the vertical position of the platform. In the method, the accelerometer output signals (S1,S2,S3) are corrected for offsets by use of a reference signal (So) and the corrected signals are used to derive the signal (A) which may be double integrated to obtain the final signal (A3) relating to vertical displacement.

13 Claims, 3 Drawing Sheets

APPARATUS FOR MEASURING THE VERTICAL MOTION OF A FLOATING PLATFORM

This invention relates to apparatus for measuring the vertical motion of a floating platform caused by wave action or swell on the sea surface.

The invention in particular, but not exclusively, relates to heave compensation in marine surveying. Echo sounders are used to measure the depth of the sea bed below the ocean surface. Inaccuracies can occur in these measurements if the survey vessel moves up and down due to the wave motion at the ocean surface. Known means of solving this problem are by using an apparatus in which an accelerometer is mounted vertically on an assembly which is kept horizontal even as the survey vessel rolls and pitches. The accelerometer can be mounted on a float in an oil bath which finds its own level or mounted on a mechanical device, gravitationally biased to keep the accelerometer vertical, for example it can be mounted in gimbels, or a gyroscopically stabilised platform, so that the accelerometer is effectively isolated from the rolling and pitching movement of the ship.

A problem associated with these known systems is that if the vessel is pitching and rolling with a high frequency and with large angles then the mechanical stabilisation systems do not respond fast enough to keep the accelerometer in its vertical axis.

Furthermore these systems are fitted to large survey ships which provide a generally stable platform for charting the sea floor. It would be an advantage if such devices could be fitted to small vessels (less than 10 meter in length) which were carried by a larger mother ship. However, because of the tendency of small vessels to pitch and roll the above described compensation apparatus are not suitable.

The present invention provides an apparatus that overcomes the above problems.

Accordingly there is provided apparatus for measuring the vertical motion of a floating platform and which comprises a sensor having three accelerometers arranged on mutually perpendicular axes so that one accelerometer is in a substantially vertical plane and the other two accelerometers are in a substantially horizontal plane, the output signals from the three accelerometers being continually sampled and the sample outputs processed in a data processor unit to provide a signal indicative of the vertical position of the platform.

Preferably there is further provided in the sensor a reference signal transmitter which produces a reference signal which is processed with the three accelerometer signals to provide said signal indicative of the vertical position of the platform.

Preferably the reference signal is a zero voltage signal that undergoes the same operational path through the apparatus as the accelerometer signals.

There is also provided a method of compensating for the vertical rise and fall of a floating platform due to wave action, said method including measuring the horizontal and vertical components of acceleration by using three accelerometers arranged mutually perpendicular to each other to produce three accelerometer output signals, passing the three output signals, preferably together with a reference signal into an analogue digital converter to produce a digital signal representation of each of the three output signals and the reference signal, and then combining the four signals in such a way as to produce a resultant signal representative of the vertical motion of the platform.

Preferably the reference signal is produced from a zero voltage signal which takes the same operational path as the three accelerometer output signals so as to allow the removal of the voltage offsets.

A well known error in vertical acceleration measurements is caused by a significant horizontal component of acceleration such as when a vessel is turning. The prior art equipment which uses gravity as a vertical reference cannot separate the horizontal and vertical components, for example in an apparatus in which a vertical accelerometer is mounted in gimbals the horizontal acceleration will cause its pendulum to tilt so that the accelerometer will in fact measure a reduced vertical component and will also measure a portion of the horizontal component of acceleration. Similarly with other known apparatus that utilise a gyroscope to maintain stability of the horizontal platform, the platform is maintained in a horizontal plane by erector motors controlled by inclinometers which are again susceptible to errors caused by horizontal acceleration.

The error due to the horizontal acceleration is the same for both prior art apparatus and the present invention using triaxial accelerometers. Therefore the method of the present invention offers equal accuracy but removes the disadvantages associated with the known mechanical self levelling apparatus when a vessel is pitching and rolling.

It is considered that a heave compensation apparatus and method as described above will also have applications other than marine survey work, for example:

a. Towed-body applications. When a body is towed behind a ship it is usually desirable to maintain it at a constant depth. However the wave motion of the ship tends to be transmitted down the cable to the towed body. This can be prevented by measuring the vertical speed of the towing point and using the data to control a variable speed winch.

b. Floating cranes. Cranes mounted on floating platforms can be difficult to control when the platform is rolling and pitching. If the vertical motion of the jib can be measured, then the position of the hook and the tension in the cable can be controlled more accurately.

The invention will be described by way of example and with reference to the accompanying drawings in which.

Figure 1:
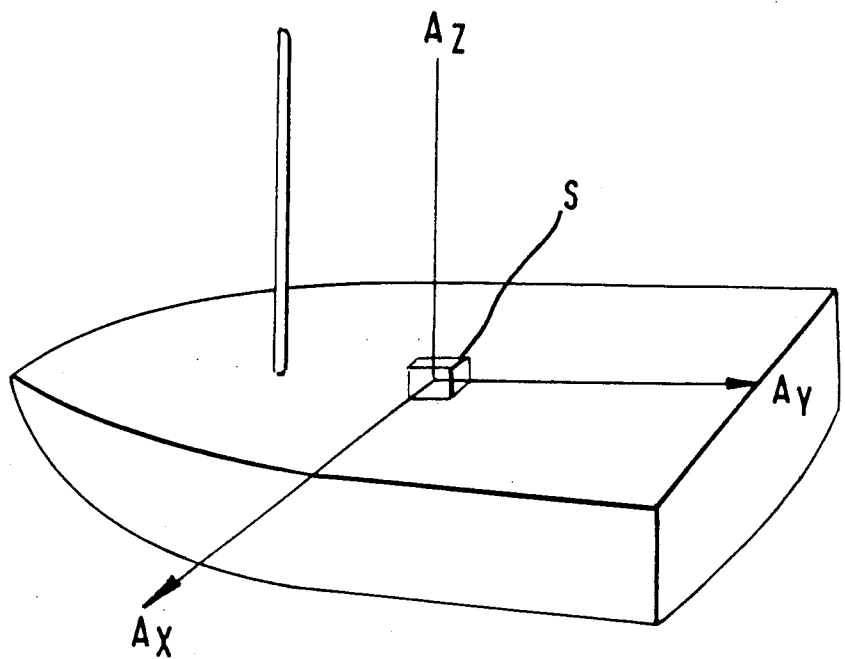
FIG. 1 is a schematic drawing of a boat showing the triaxial accelerometer sensor located on the pitch and roll axes of the vessel and a triaxial magnetometer located on the mast.
Figure 2:
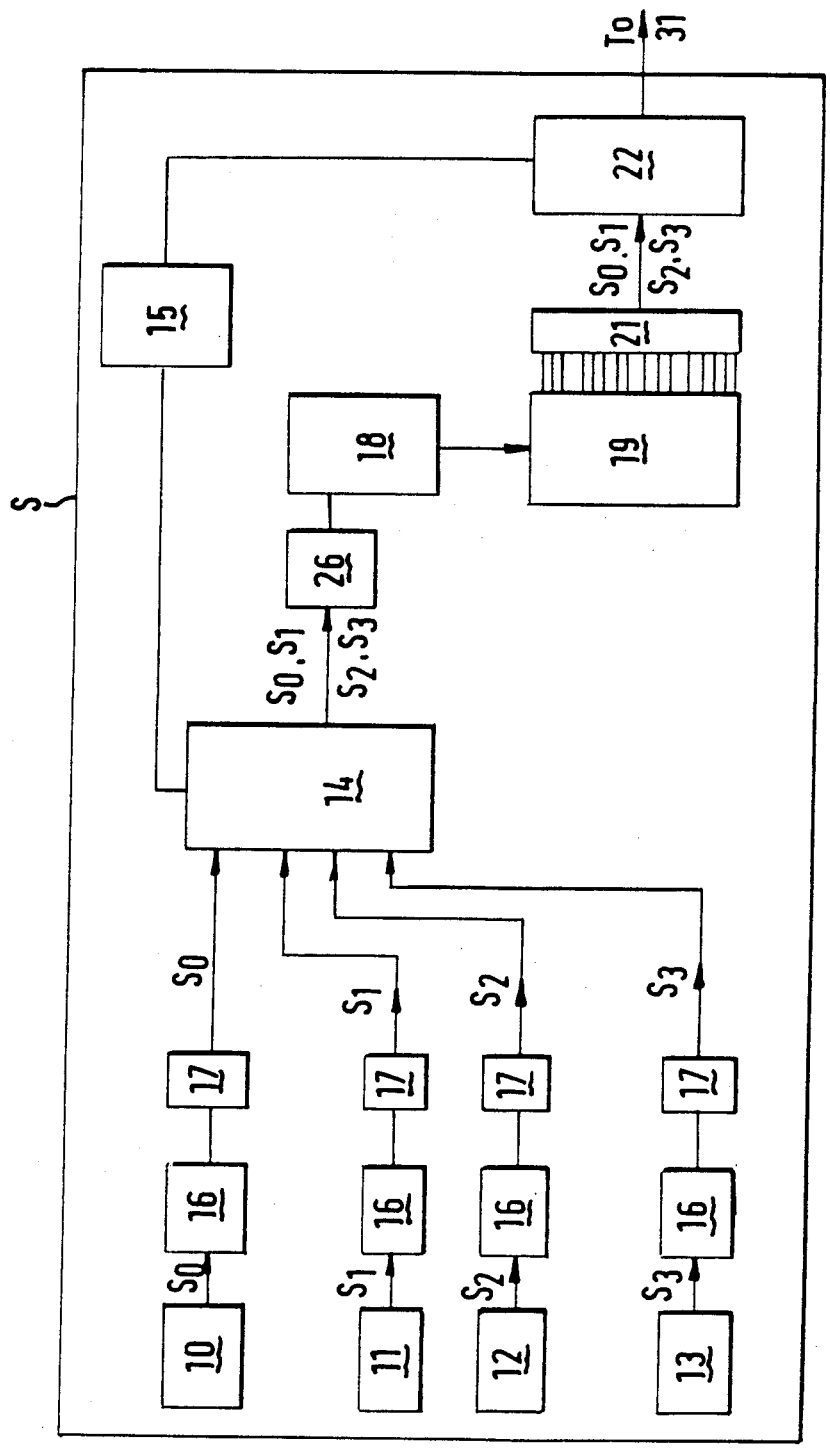
FIG. 2 is a schematic drawing illustrating the sensor means for processing the accelerometer signals into digitalised format.

With reference to FIG. 1, three accelerometers 11, 12, 13, are mounted in a sensor 5 on three mutually perpendicular axes in a block which is to be located on a floating platform, illustrated for convenience is a boat, at the intersection of roll and pitch axes. The accelerometers 11, 12, and 13 are mounted so that one accelerometer measures forces in a substantially vertical axis Az and the other two accelerometers measure forces in a substantially horizontal plane showing axes Ax and Ay. The accelerometers 11, 12, 13 are preferably inertial grade accelerometers such as Sundstrand Data Control QA2000 accelerometers available from Sundstrand Data Control Inc. The output voltage signals S1, S2 and S3 of the accelerometers 11, 12, 13 respectively are converted into digital form within the sensor and are first fed into a multiplexer switch 14, after each having passed through a respective high impedance buffer 16 and an anti aliasing filter 17 to produce a very high precision signal. The multiplexer switch 14 also receives a reference signal So, preferably zero volts, from a reference signal transmitter 10. The signal So also passes through a respective buffer 16 and filter 17, so that the reference signal passes through the same operational path as the accelerometer output signals. The four signals S0, S1, S2 and S3 can only be passed singularly through the multiplexer switch 14, which is operated by a controller 15 which selects each signal S0, S1, S2 or S3 in sequence for passage of the signal through the multiplexer 14. Each signal is connected through the multiplexer for a time period of about 1.5 milliseconds. The signals S0, S1, S2 and S3 are then passed in sequence through a second high impedance buffer 26 to a Track and Hold amplifier 18 (TAH). The signals S0, S1, S2 and S3 are then passed to an Analogue Digital Converter 19 (A.D.C.) which converts each analogue voltage signal into a 16 Bit representative digital number. The 16 Bit output signal is then passed through an output shift Register 21 to convert the 16 Bit parallel line data signal into a single line serial data signal. The serial signals SS0, SS1, SS2, SS3 is then passed through a Data Transmitter 22. The data transmitter 22 has an internal clock which governs the frequency with which the signals S0, S1, S2, S3 are passed through to a data processor which then converts the digital signals into information relating to the vertical movement of the floating platform. Because the frequencies of sea wave motion of more than 1 Hz have no practical importance, then the sampling of a signal at the multiplexer every 1.5 milli-secs means essentially that the sensor operates in real time.

The Data transmitter 22 is also connected to the TAH 18 and the control 15 for the multiplexer switch 14 to co-ordinate the signals passed to the TAH for digital conversion in the ADC 19 and subsequent transmission of that information. The TAH 15 holds a signal frozen at a moment controlled by the clock of the data transmitter 22 whilst the ADC 19 converts the frozen signal.

The digitalised serial signal is transmitted from the data transmitter 22 to a data processor through a data link which would normally be cable, but which could be a radiolink, in frames of four numbers each of which corresponds to a respective signal S1, S2, S3 or S0, each number being in 16 Bit serial format.

Figure 3:
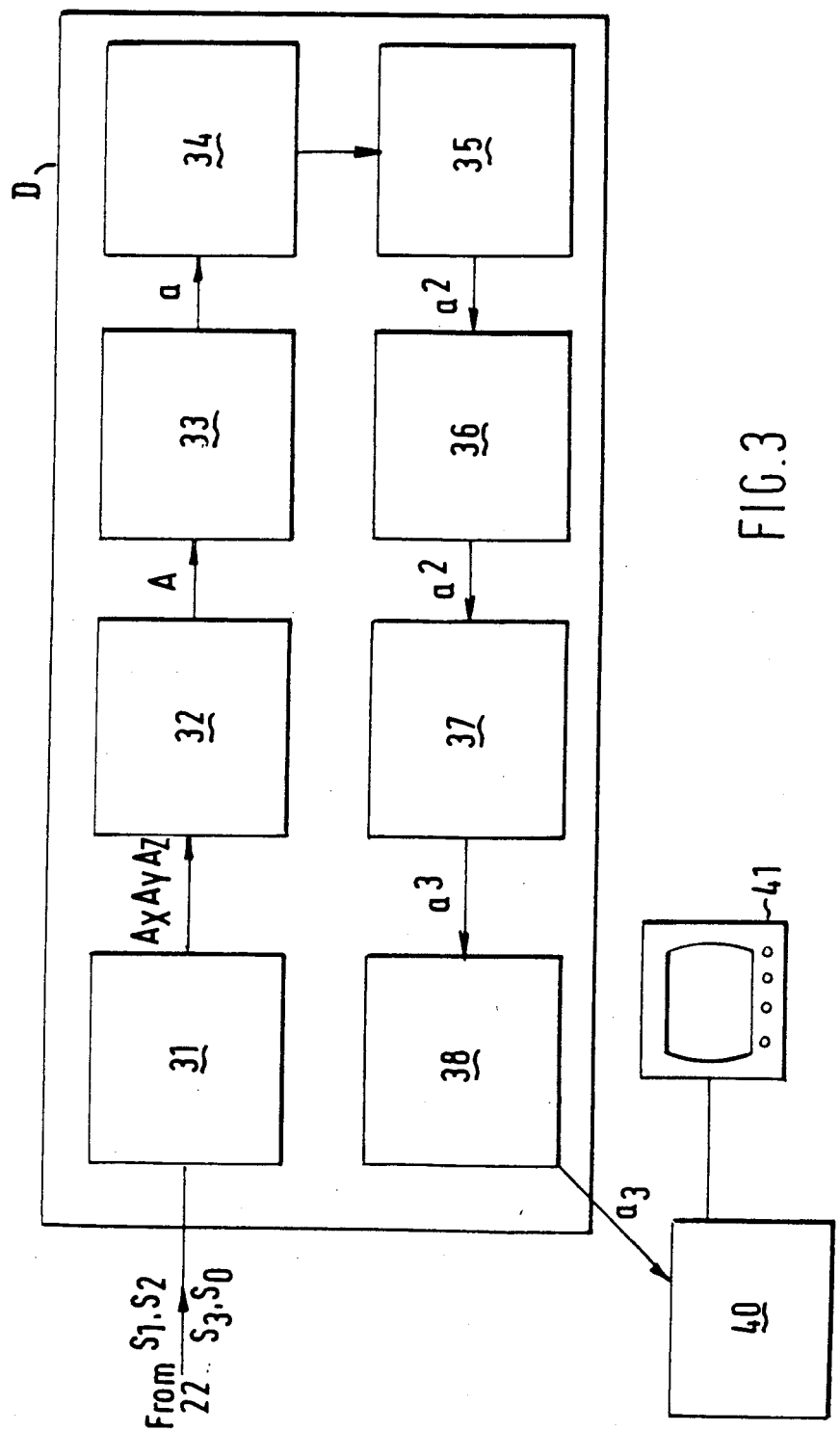
FIG. 3 is a schematic drawing illustrating the data processing of the signals from the triaxial accelerometers.

Now with reference to FIG. 3, the digitalised signals S1, S2, S3 and S0 are fed into a data processor unit D which then performs a series of operations in sequence. The signals are converted back to parallel format and at a first processor 31, eight signals of each respective digitised signal S1, S2, S3 and S0 are collected and averaged out to give mean values for S1, S2, S3 and S0. The mean reference signal S0 is then substracted from the mean accelerometer signals S1, S2, S3 to give the true accelerometer outputs AX, AY, AZ. This is represented by:

$AX = S1 - S0$) Where $AX$, $AY$ and $AZ$ are the
$AY = S2 - S0$) accelerometer signals in the
$AZ = S3 - S0$) $X$, $Y$ and $Z$ axes respectively.

Since the reference signal has passed through the same operational path as the accelerometer signals, by subtracting the reference signal it is possible to remove the voltage offsets from the equation.

At a second processor 32 the magnitude of the total acceleration A is expressed as the square root of the summation of the squares of the accelerometer outputs. Thus $$A = (Ax2 + Ay2 + Az2)^{\frac{1}{2}}$$

In the absence of any appreciable external forces A will be the gravitation acceleration G whatever the orientation of the sensor axes to the vertical. If the apparatus is now accelerated vertically (due to the rise and fall on the ocean surface waves) in the absence of any appreciable horizontal components of acceleration, then the total vertical acceleration A equals the gravitational acceleration G plus the vertical acceleration 'a' due to wave movement that is $$A = G + a$$

This holds true irrespective of the orientation of the apparatus to the vertical. Since G is constant the signal A is passed through a high pass filter 33 to remove the constant gravitational component.

The resultant signal 'a' is then passed through a phase equalisation filter 34 to remove any phase distortions introduced by filters in the system and is then integrated by integrator 35 by either computation or by use of electronic circuitry. The integrated signal a2 is then passed through a high pass filter 36 and then integrated for a second time by integrator 37 to give a double integrated signal A3 which is passed through another high pass filter 38 which produces a high quality signal which is proportional to the vertical travel of the platform. The double integrated signal a3 is in digital form and if being used on board a marine survey vessel can be coupled directly to an echo sounder 40.

The signal a3 relating to vertical displacement is taken at a rate of about 22 times per second, so that the signals S1, S2, S3 and S0 are being fed into the processor unit D from the data transmitter 22 at a total rate of about 680 signals per second.

The heave compensator signal will be a few milli-seconds behind the echo sound signal but this can be compensated for in a known manner.

If the echosounder operates on a digitalised signal to produce a numeric depth value, the signal from the heave compensator can be directly fed into the echosounder to give a corrected depth. The echosounder can display measured depth, heave and corrected depth. These measurements can be visually displaced on an echo chart recorder 41. If the total component of acceleration is in the vertical axis only as in a sudden rise on a wave, then the digitalised accelerometer output signals S1, S2 and S3 can also be utilised to give a measure of the vessel pitch and roll angles, as indicated below:

$$\text{Sine roll angle} = \frac{(Ax)}{(A)}$$

$$\text{Sine pitch angle} = \frac{(Ay)}{(A)}$$

I claim:

1. An apparatus for measuring the vertical displacement of a floating platform caused by wave action and which comprises a sensor having three accelerometers arranged on mutually perpendicular axes so that one accelerometer acts in a substantially vertical plane and the other two accelerometers act in substantially horizontal plane, output signal means producing output signals from the three accelerometers, a reference signal transmitter which produces a reference signal, sampling means to continually sample and the accelerometer output signals and the reference signal, and a data processor unit to process the sampled output signals and reference signal to provide a signal indicative of the vertical position of the platform.

2. An apparatus as claimed in claim 1 wherein the accelerometers are inertial grade accelerometers.

3. Apparatus as claimed in claim 1 wherein the reference signal transmitter is a zero voltage sender which follows the same operational path through the sensor as the accelerometer output signals, and allows removal of offsets in the accelerometer signals.

4. Apparatus as claimed in claim 3 wherein the sample means includes a multiplexer switch, and analogue digital converter (ADC) the three output signals from the accelerometers and reference signal are sent to the multiplexer switch for selection of any one of the four signals so that only one signal at a time can be passed to the ADC which converts each of said signals into a digital number representative to the acceleration.

5. Apparatus as claimed in claim 4 wherein the ADC can digitise each output signal and the reference signal at least 100 times a second.

6. Apparatus as claimed in claim 4 wherein the sample means includes a controller which operates the multiplexer switch to select the signals in sequence for passing on to the ADC, each signal being connected to the ADC for a period of approximately 1.5 millisecs.

7. Apparatus as claimed in claim 4 wherein the sample means further includes a Track and Hold Amplifier (TAH) and the output signal from the mulitplexer switch is fed into the TAH which freezes the signal during the period that the ADC is converting said signal.

8. Apparatus as claimed in claim 4 wherein the sensor further includes means for converting the digital numbers representing the four signals into four series of signals for transmission to the data processor.

9. A method of compensating for the vertical displacement of a floating platform due to wave action said method comprising measuring the horizontal and vertical components of acceleration by means of three accelerometers arranged mutually perpendicular to each other to produce three accelerometer output signals, correcting the output signals for offsets by using a reference signal which takes the same operational path as the output signals, sampling said signals and passing said signals into a data processor for derivation of the vertical movement.

10. A method as claimed in claim 9 wherein the accelerometer output signals and the reference signal are digitised to produce digital signals representative of each of the three output signals and the reference signal, and then combining the four signals to produce a resultant signal representative of the vertical motion of the platform.

11. A method as claimed in claim 10 wherein the reference signal is subtracted from each of the three output signals to remove offsets and to provide corrected accelerometer output signals, the corrected accelerometer output signals each being squared, summing the squares of these corrected signals and taking the square root of the summation to arrive at a result that is representative of the vertical movement of the platform.

12. A method of determining the pitch and roll angle of a floating platform due to wave action, said method including measuring the horizontal and vertical components of acceleration by means of three accelerometers arranged mutually perpendicular to each other to produce three accelerometer output signals, correcting the output signals for offsets by use of a reference signal which takes the same operational path as the output signals and passing said signals into a data processor, wherein the pitch and roll angles are given by dividing the respective horizontal component of acceleration by the vertical component of acceleration, to obtain the sine value of said respective angle.

13. A method as claimed in claim 12 wherein the accelerometer output signals and the reference signal are digitised to produce digital signals representative of each of the three output signals and the reference signal, and then combining the four signals to produce a resultant signal representative of the vertical motion of the platform, wherein the reference signal is subtracted from each of the three output signals to remove offsets and to provide corrected accelerometer output signals, the corrected accelerometer output signals each being squared, summing the squares of these corrected signals and taking the square root of the summation to arrive at a result that is representative of the vertical movement of the platform.

* * * * *